(No Model.)

W. A. BIRCH.
FLOWER POT HOLDER AND SHIELD.

No. 286,993. Patented Oct. 23, 1883.

WITNESSES.
Wilmer Bradford
Edwin Derby

INVENTOR.
William A. Birch
By C. W. M. Smith
Attorney.

UNITED STATES PATENT OFFICE.

WILLIAM A. BIRCH, OF SAN FRANCISCO, CALIFORNIA.

FLOWER-POT HOLDER AND SHIELD.

SPECIFICATION forming part of Letters Patent No. 286,993, dated October 23, 1883.

Application filed February 16, 1883. (No model.)

*To all whom it may concern:*

Be it known that I, WILLIAM ALEXANDER BIRCH, a citizen of the United States, residing at San Francisco, in the county of San Francisco and State of California, have invented a new and useful Flower-Pot Holder and Shield, of which the following is a specification.

It is a well-known fact that the common flower-pot, made of ordinary brick-clay and used without enamel or paint, is far the most preferable for propagating and raising plants and shrubs, for the reason, among others, that the excess of moisture and dampness will pass off through the porous substance of which the pot is made, and preserve the plant in a flourishing condition; but such a pot in a household is unsightly, and cannot be kept tidy without considerable care; hence the object of my invention is to provide a means whereby such unsightly flower-pots are covered, and at the same time permit the excess of moisture and dampness to escape. I accomplish this object by means of the device illustrated in the accompanying drawings, forming part of this specification, in which—

Figure 1:
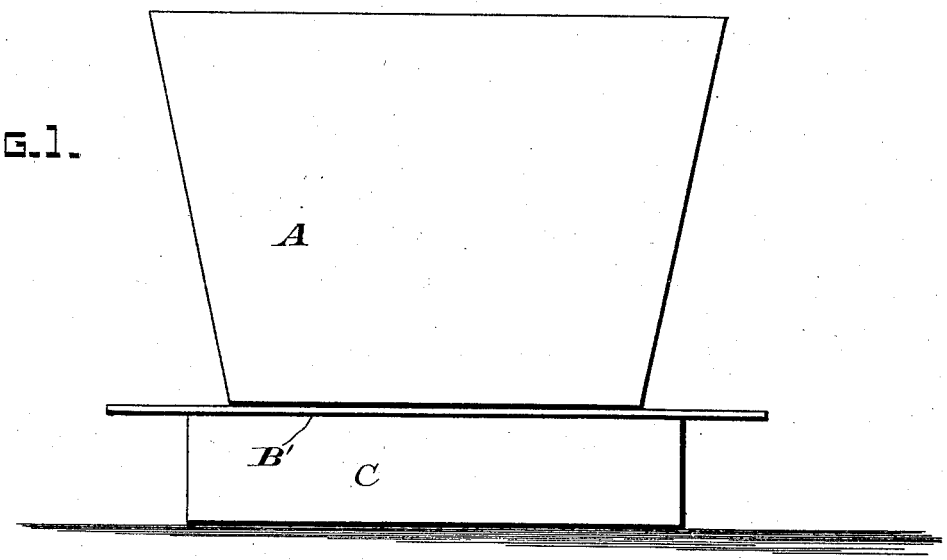
Figure 2:
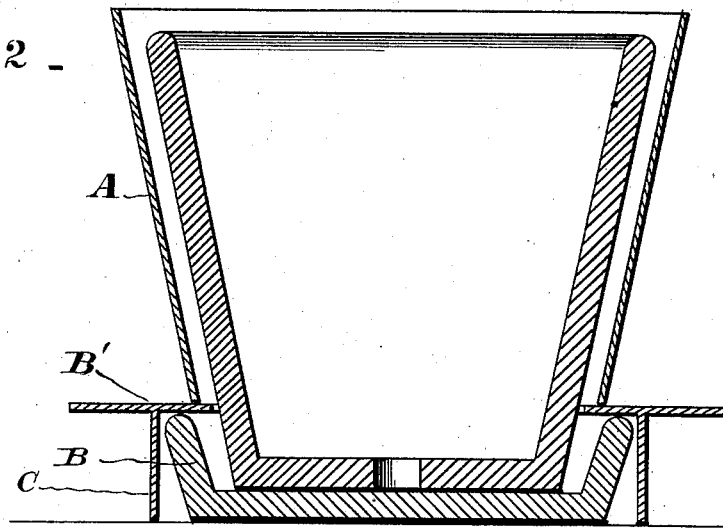

Figure 1 is a front elevation of my improved flower-pot cover or shield, and Fig. 2 is a central vertical section of the same.

My flower-pot shield and holder A, I construct of papier-maché, clay, or other material, suitably ornamented to please the fancy. It is made larger and higher than the flower-pot proper, which it is intended to cover, so as to admit of the circulation of air, light, and heat, and generally conforms to the tapering form of the flower-pot, and the two may be lifted together from the saucer or tray. The saucer or tray B of the flower-pot is also provided with a shield, B', which is constructed in the shape of a disk, with a hole or opening large enough to receive the smaller end of the flower-pot, and is supported by a collar, C, which is attached to the under face of the disk, as shown. When this shield is in position, the saucer or tray is completely covered and hidden from view, with the lower end of the flower-pot resting upon the bottom of the saucer, and the tapering end of the shield or holder extending downward through the opening in the disk, or resting upon the disk, as shown. For convenience in lifting or removing the flower-pot from the shield, notches may be cut in the top edge and at opposite sides thereof large enough to receive the ends of two fingers, by which means the pot may be quickly removed for cleaning and replaced with ease; but these notches are not essential, as the flower-pot and shield may be lifted together from the saucer and saucer or tray cover.

Having thus described my invention, what I claim, and desire to secure by Letters Patent, is—

The combination, with the flower-pot shield A, of the saucer cap or cover B', having a supporting collar or stand, C, and provided with an opening for surrounding the lower end of the flower-pot, substantially as described.

In testimony that I claim the foregoing I have hereunto set my hand and seal.

WILLIAM A. BIRCH. [L. S.]

Witnesses:
C. W. M. SMITH,
CHAS. E. KELLY.